United States Patent
Zhesnik et al.

(10) Patent No.: US 11,966,641 B1
(45) Date of Patent: Apr. 23, 2024

(54) USER-DEFINED BOUNDARIES FOR DOCUMENTS

(71) Applicant: Xerox Corporation, Norwalk, CT (US)

(72) Inventors: Yolanda R. Zhesnik, Webster, NY (US); Amanda Applin, Jericho, VT (US); Steven L. Aurand, Fairport, NY (US); Kim P. Ciulla, Bloomfield, NY (US); Lee C. Moore, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/168,099

(22) Filed: Feb. 13, 2023

(51) Int. Cl.
*G06F 3/12* (2006.01)

(52) U.S. Cl.
CPC .......... *G06F 3/1219* (2013.01); *G06F 3/1208* (2013.01); *G06F 3/1242* (2013.01); *G06F 3/1256* (2013.01); *G06F 3/1284* (2013.01)

(58) Field of Classification Search
CPC .... G06F 3/1208; G06F 3/1219; G06F 3/1242; G06F 3/1256; G06F 3/1284
See application file for complete search history.

(56) References Cited

U.S. PATENT DOCUMENTS

| | | | | |
|---|---|---|---|---|
| 5,473,740 | A * | 12/1995 | Kasson | G06F 3/04845 358/453 |
| 5,640,647 | A | 6/1997 | Hube | |
| 7,643,704 | B2 * | 1/2010 | Jackson | H04N 1/3873 382/293 |
| 8,553,274 | B2 * | 10/2013 | Imine | H04N 1/00442 358/1.14 |
| 8,896,850 | B1 * | 11/2014 | Buck | H04N 1/00477 399/130 |
| 10,834,287 | B1 * | 11/2020 | Chakrabarty | H04N 1/626 |
| 10,970,580 | B2 * | 4/2021 | Nakatsuka | G06V 30/153 |
| 2015/0156371 | A1 * | 6/2015 | Yokomizo | H04N 1/4074 358/452 |
| 2022/0374178 | A1 * | 11/2022 | Kim | H04N 1/6072 |

FOREIGN PATENT DOCUMENTS

EP        1802094 A2    6/2007

* cited by examiner

*Primary Examiner* — Scott A Rogers

(57) ABSTRACT

A method for printing a document with user-defined boundaries is disclosed. For example, a method is executed by a processor of a multi-function device (MFD) and includes receiving a user-defined boundary of a document that excludes a portion of at least one page, identifying content within the user-defined boundary, generating an MFD job with the content, and executing the MFD job.

17 Claims, 5 Drawing Sheets

USER-DEFINED BOUNDARIES FOR DOCUMENTS

The present disclosure relates generally to multi-function devices (MFDs) and relates more particularly to user-defined boundaries for printing documents and/or saving user-defined boundaries for scan jobs and copy jobs.

BACKGROUND

Multi-function devices (MFDs) are electronic devices that can perform a variety of different functions. For example, MFDs can print, scan, copy, fax, email scanned documents, transmit scanned documents to a network storage account, and the like.

When printing documents, an MFD can generally print the entire document or can print certain pages of the document. For example, the user may select a page range or a particular page of the document.

SUMMARY

According to aspects illustrated herein, there are provided a method and a multi-function device (MFD) for processing a job request for a document with a user-defined boundary. One disclosed feature of the embodiments is a method executed by a processor of a multi-function device (MFD), comprising receiving a user-defined boundary of a document that excludes a portion from at least one page, identifying content within the user-defined boundary, generating an MFD job with the content, and executing the MFD job.

Another disclosed feature is an MFD comprising a processor and a non-transitory computer readable medium storing instructions, which when executed by the processor, cause the processor to receive a user-defined boundary of a document that excludes a portion from at least one page, identify content within the user-defined boundary, generate an MFD job with the content, and execute the MFD job.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for processing a job request for a document with user-defined boundaries. As discussed above, MFDs may be used to process documents. When printing a document, an MFD can generally print the entire document or can print certain pages of the document. For example, the user may select a page range or a particular page of the document.

However, a user may want to print portions of a document that span across two pages of the document, but could fit onto a single page. Using currently available print selection options, the user would be required to print two pages. This may unnecessarily waste paper and ink.

Another option may be for the user to cut and paste the desired content into a new document. The user would be required to create a new document and to cut and paste the desired content from the existing document into the new document. However, this requires additional time and steps to print the desired content. The new document that is created may also consume additional memory and may clutter files and create various sub documents that could cause confusion in the future.

The present disclosure provides a method and apparatus that allows a user to select a custom defined boundary in an existing document. The content within the user defined boundary can then be printed without including any extra content on the page or pages that was not selected (i.e., that is not within the boundary). This may allow the desired content to be printed on a single page, which leads to cost savings by consuming less ink and potentially less paper. Also, processing documents with the user defined boundary may alleviate frustration of the user due to printing of unwanted content in the print job.

Figure 1:
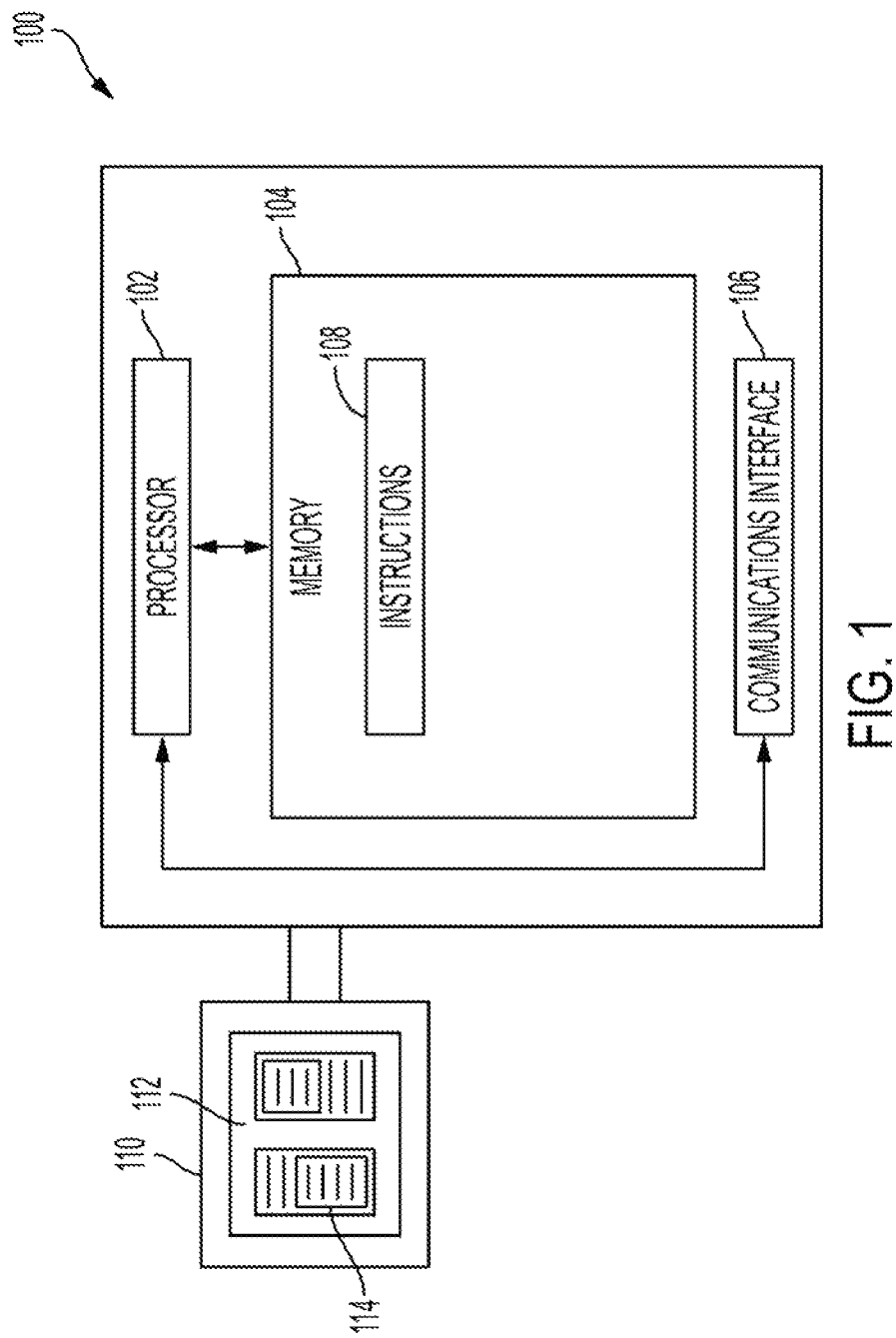
FIG. 1 illustrates an example MFD of the present disclosure.

FIG. 1 illustrates an example MFD 100 of the present disclosure. The MFD 100 has been simplified for ease of explanation and may include additional components that are not shown. For example, the MFD 100 may include digital front end (DFE), an optical scanner, a printhead, various paper trays, various finishing components, and the like.

In one embodiment, the MFD 100 may include a processor 102, a memory 104, a communications interface 106, and a display 110. The processor 102 may be communicatively coupled to the memory 104, the communications interface 106, and the display 110.

In one embodiment, the memory 104 may be any type of non-transitory computer readable medium. For example, the memory 104 may be hard disk drive, a solid state drive, a non-volatile memory express (NVMe) memory card, random access memory (RAM), read-only memory (ROM), and the like.

The memory 104 may store instructions 108. The instructions 108 may be executed by the processor 102 to perform the functions described herein. For example, the instructions 108 may cause the processor 102 to perform functions to print a document with user-defined custom boundaries, as described in further detail below. For example, the method 400 illustrated in FIG. 4 may provide an example of the instructions 108 that can be executed by the processor 102.

In one embodiment, the processor 102 may control operation of the communications interface 106 and the display 110. The communications interface 106 may be a wired or wireless communication interface. For example, the communications interface 106 may be a wireless radio, a WiFi interface, or an Ethernet cable connection. The MFD 100 may be communicatively connected to an endpoint device to receive print job requests and/or user-defined boundaries of a document, as discussed in further detail below.

The display 110 may be a touch screen or a non-touch screen. The display 110 may provide a user interface 112. In some examples, the user-defined boundaries may be selected via the user interface 112 of the display 110. For example, the user interface 112 may display a preview of the print job and may allow a user to select a user-defined boundary 114 for the document. The user may use his or her finger to select the user-defined boundary 114 for touch screen interfaces or may use an input device (e.g., a mouse or touch pad) for non-touch screen interfaces.

In one embodiment, the user-defined boundary 114 may be selected via a drop down menu that provides different options. As discussed in further detail below, the user-defined boundary 114 may be defined by a particular chapter, a particular section in the document, a particular type of formatting, a start word and an end word, and the like.

Figure 2:
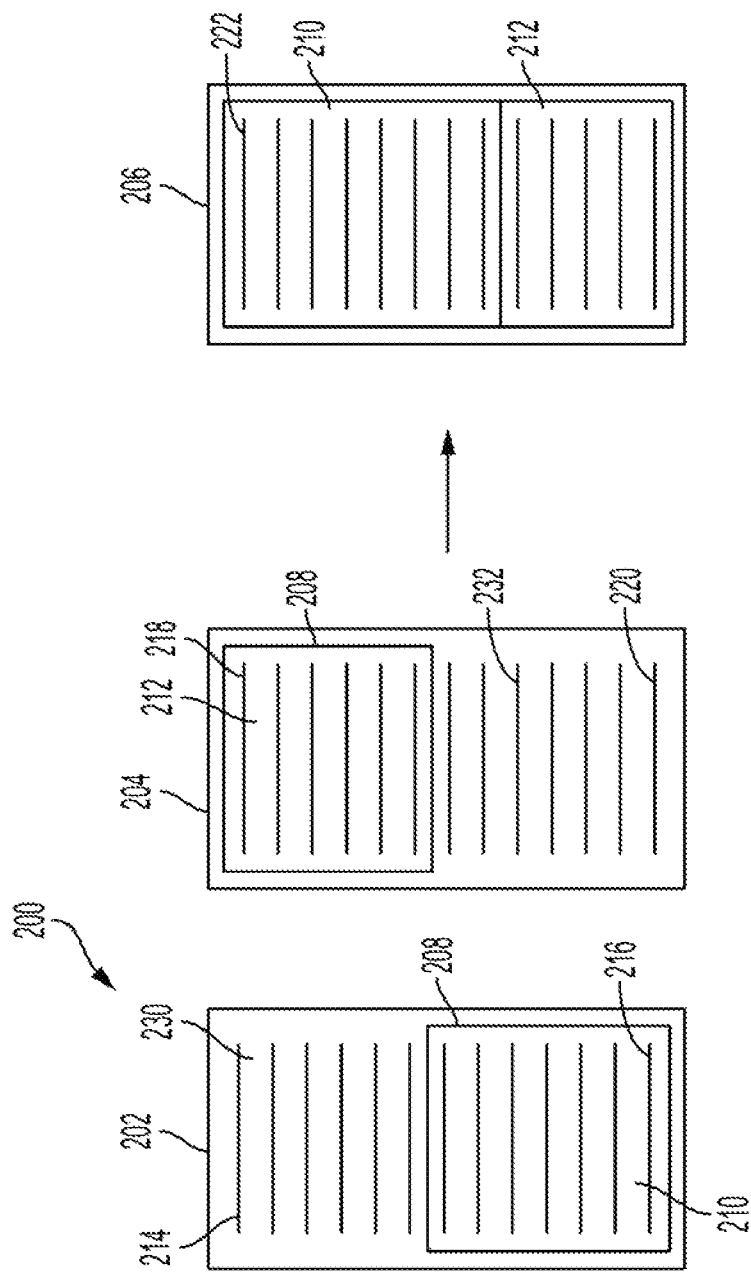
FIG. 2 illustrates a block diagram of a document printed with user-defined custom boundaries of the present disclosure.

FIG. 2 illustrates an example of the user-defined boundary 114 of the present disclosure. In one embodiment, a user may want to print a portion of a document 200. The document 200 may be any type of file or document that can be printed. For example, the document 200 may be a word processing document (e.g., a Word file), a presentation document (e.g., a Power Point file), a portable document file (PDF), a web page (e.g., a hyper-text mark-up language (HTML) file), any printer description language (PDL) supported by a device, a scanned document, and the like.

In one embodiment, the document 200 may include at least one page. However, the example illustrated in FIG. 2 may include multiple pages. For example, the document 200 may include a first page 202 and a second page 204. The first page 202 may include content that begins on a first line 214 and ends on a last line 216 within the printable area of the first page 202. The second page 204 may include content that begins on a first line 218 and ends on a last line 220 within the printable area of the second page 204.

The user may want to print a first portion of content 210 on the first page 202 and a second portion of content 212 on the second page 204. Previously, the user would be required to print two pages that include undesirable content 230 on the first page 202 and undesirable content 232 on the second page 204.

The present disclosure allows a user to select a custom boundary or a user-defined boundary 114. In one embodiment, the user-defined boundary 114 is shown by a line 208 on the first page 202 and the second page 204. Notably, the user-defined boundary 114 represented by the line 208 excludes the undesirable content 230 and the undesirable content 232. The user-defined boundary 114 may also begin or end after the first line 214 or before the last line 216. In other words, the user-defined boundary 114 of the present disclosure may include at least one page that does not include the entire page. For example, the user-defined boundary 114 represented by the line 208 begins between the first line 214 and the last line 216 of the first page 202 and ends after the first line 212 and before the last line 220 of the second page 204.

Although the user-defined boundary 114 is represented by the line 208 that outlines the desired content in FIG. 2, it should be noted that the user-defined boundary 114 may be determined using other types of markers, discussed in further details below. For example, the user-defined boundary 114 may be defined by a particular beginning word and ending word, a chapter, a section, content in a particular font or formatting, and the like.

After the user-defined boundary 114 is selected, the MFD 100 may generate a print job that includes the content 210 and content 212 within the user-defined boundary 114. The print job may print a document or page 206 that includes the content 210 and content 212. The MFD 100 may generate the document 206 such that the content 210 and content 212 is moved to the beginning of the page 206. In other words, the content 210 and content 212 are printed on the page 206 beginning at the first printable line 222 on the page 206.

In addition, the MFD 100 may remove unwanted white space (if any) between paragraphs or sections that may be included within the user-defined boundary 114. For example, the user-defined boundary 114 may include a page break between the end of a chapter and a beginning of a chapter that may include white space with no content. The MFD 100 may automatically remove the white space, such that the beginning of the chapter begins on the line immediately after the end of the previous chapter contained within the user-defined boundary 114. Thus, the content 210 and content 212 that spanned across two pages 202 and 204 can be condensed into a single page 206. As a result, the reduction in paper and consumed ink may help reduce printing costs.

Although FIG. 2 illustrates that the user-defined boundary 114 is a continuous selection across consecutive pages, it should be noted that the user-defined boundary 114 may include multiple boundaries across several different pages. For example, the user may define the user-defined boundary 114 to include portions of content from pages 1 and 2, then select portions of content from pages 33-35, then select portions of content from pages 50-51 of a document that includes pages 1-51. The page or pages 206 that are printed may then include the content within the user-defined boundary 114 that includes the content from pages 1 and 2, pages 33-35, and pages 50-51. Notably, the user did not have to cut and paste the selected content into a new document. Rather, the user may simply make the selections, and the MFD 100 may generate the print job with the content within the user-defined boundary 114 that is defined across several discontinuous pages of a document.

In addition, although FIG. 2 illustrates an example where the user-defined boundary 114 is used to reduce two pages 202 and 204 into a single page 206, it should be noted that the user-defined boundary 114 may be used to reduce a document into several pages. For example, the user-defined boundary 114 may span ten pages within the document 200. The present disclosure may reduce the content within the user-defined boundary 114 from the ten pages to less than ten pages (e.g., 9 pages or less).

Although the example illustrated in FIG. 2 is discussed with respect to a print job, it should be noted that the user-defined boundary 114 may be used to process any type of job performed by the MFD 100. For example, the user-defined boundary 114 may be used for a print job, a scan job, or a copy job. In one embodiment, the user-defined boundary 114 may be saved as being associated with the document 200.

For example, the user-defined boundary 114 may be saved for the document 200 and stored in the memory 104 of the MFD 100 or in a network storage server or printer server in the cloud. Thus, when a user wants to print the document 200, the user-defined boundary 114 may be automatically added, such that the document 200 is always printed with the user-defined boundary 114. To illustrate, the user-defined boundary 114 may be selected to be chapter 3 of the document 200. When the user-defined boundary 114 is saved and the user prints the document 200, only chapter 3 would be printed automatically, rather than having to re-select or re-define the user-defined boundary 114.

In one embodiment, the content included within the user-defined boundary 114 may be saved as a new document. For example, the user may print only section 3 from a monthly report. However, the data and/or content in section 3 may be updated or may change each month. Rather than having to reapply the user-defined boundary 114 each month, the new document may be saved to automatically include the current content in section 3 from the monthly report. Thus, the user may simply print the user-defined boundary 114 of section 3, and the most up-to-date content may be included from section 3 of the monthly report.

In one embodiment, the user-defined boundary 114 may be saved as a separate output file from the document 200 and may be stored in the memory 104 of the MFD 100 or in a network storage server or print server in the cloud. As a result, a user may retrieve the user-defined boundary 114 for the document 200 at a later time, without having to reselect or redefine the user-defined boundary 114 for the document 200. For example, when the user opens the document 200 and selects a print option, one of the available options from the print menu may be to apply the separate output file of the user-defined boundary 114 that was previously saved.

Figure 3:
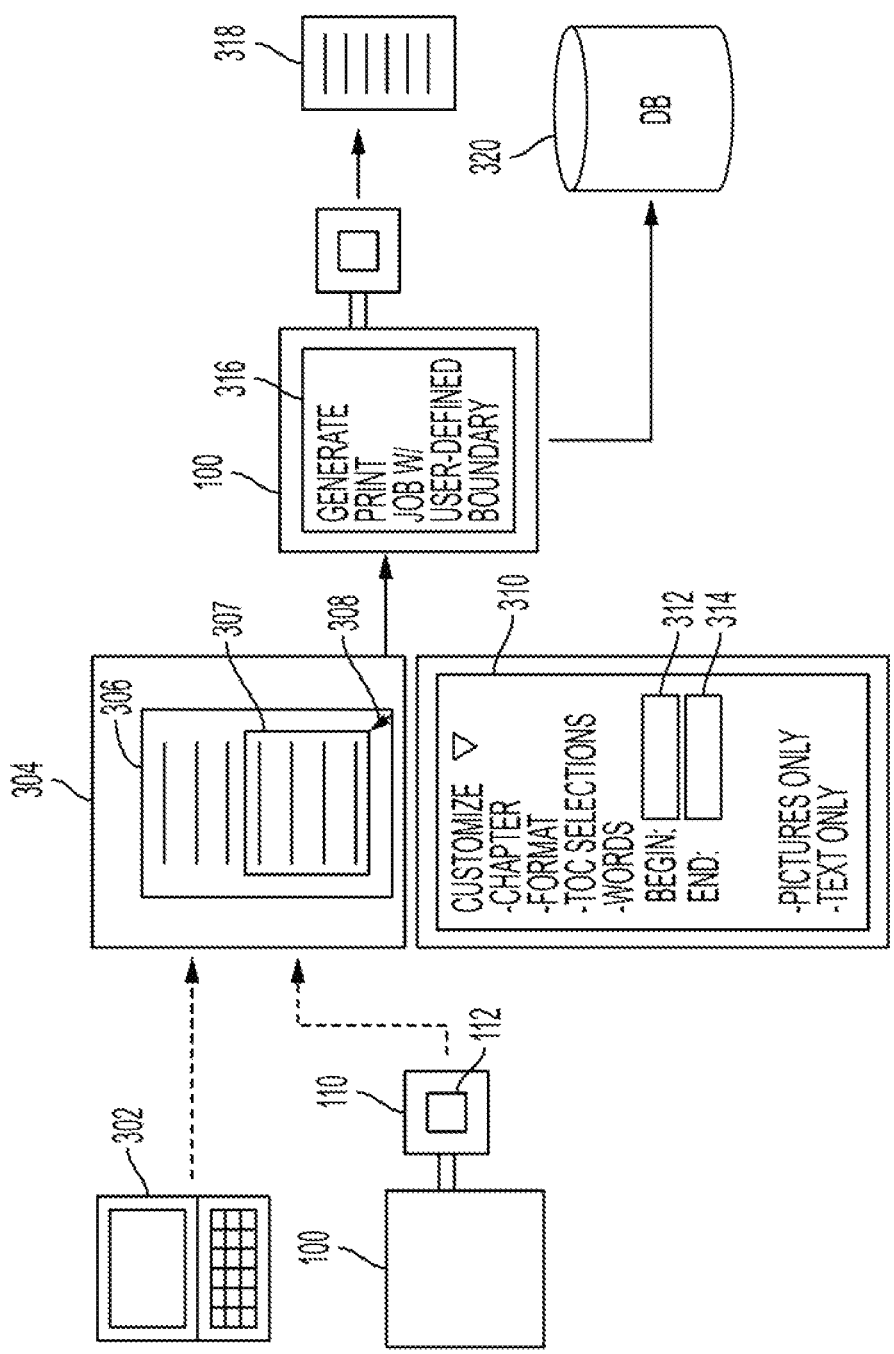
FIG. 3 illustrates an example user interface of options for user-defined boundaries for documents of the present disclosure.

FIG. 3 illustrates example user interfaces 304 and 310 that can be used to define the user-defined boundary 114 of the present disclosure. In one embodiment, the user-defined boundary 114 may be selected from a user interface of an endpoint device 302. The endpoint device 302 may be a laptop computer, a desktop computer, a tablet computer, a smartphone, or any other type of electronic device that can submit a print job to the MFD 100 for execution. In one embodiment, the endpoint device 302 may have a touch screen graphical user interface (GUI) or a non-touch screen with input devices (e.g., a mouse, a trackpad, a keyboard, and the like).

In one embodiment, the user-defined boundary selections may be added to the endpoint device 302 via a driver associated with the MFD 100 that can be installed on the endpoint device 302. In another example, the user-defined boundary selections may be part of an application executed by the endpoint device 302. In other words, the ability to select the user-defined boundary 114 may be separately licensed to third-parties to allow the third-parties to install the feature directly in the application.

In one embodiment, the user-defined boundary selections may be provided locally on the MFD 100. For example, the user-defined boundary 114 may be selected from the GUI 112 on the display 110 of the MFD 100. In another embodiment, the user may outline the desired boundary on a document and scan the document on the MFD 100. The MFD 100 may use an optical character reader to detect the drawn boundary on the document to identify the desired content.

With either the endpoint device 302 or the MFD 100, the user interfaces 304 or 310 may be presented to a user. The user interface 304 may display a preview of the pages of the document 306. The user may then use his or her finger for a touch screen display, or may control a pointer 308 with an input device for non-touch screen displays, to draw an outline 307 around the desired content on the document 306.

The user interface 310 may provide a drop down menu of possible selections or options for a user-defined boundary 114. For example, the drop down menu may allow a user to select a chapter, select content based on a format, select content based on a selection from a table of contents (TOC), or provide a begin word in a field 312 and an end word in field 314, select only text or only pictures for documents that include pictures and text, and the like.

A document may be divided by chapters or may have content organized by various sections defined by a table of contents. A chapter may span across several pages and may start in the middle of a page and end in the middle of another page. Selecting a chapter may reorganize the contents of the chapter to start at the beginning of a page and may in one embodiment also save at least one page when printed. Selecting a section from a table of contents may exclude additional content that may be on the page when the selection begins in a middle of a page or ends in a middle of a page.

In one embodiment, the document may have different sections with different formatting. For example, different sections may be written in different font types, font sizes, or both font and size. The user may select to define a boundary around the content that is written in a particular font or a particular size.

In one embodiment, a user may find it easier to provide the custom boundary using a beginning word and an ending word. The user may provide the beginning word in the field 312 and the ending word in the field 314. The MFD 100 or the endpoint device 302 may search for the matching words. If multiple matching words are found, the user interface (via the MFD 100 or the endpoint device 302) may present the user with the instances of the matching beginning word and/or ending word and may allow the user to select with which instances to begin and/or end the user-defined boundary 114.

Although the user interfaces 304 and 310 are shown as separate examples, it should be noted that the user interfaces 304 and 310 may be combined into a single user interface. For example, the user interface may provide the user an option to draw the user-defined boundary 114 or use one of the drop down menu options.

After the user-defined boundary 114 is identified, the MFD 100 may generate a print job 316 that includes content within the user-defined boundary. The print job 316 may be executed to print a document 318. In one embodiment, the print job 316 may be saved to a database 320 or another memory device (e.g., a memory stick inserted into a universal serial bus (USB) interface located on the MFD 100).

Figure 4:
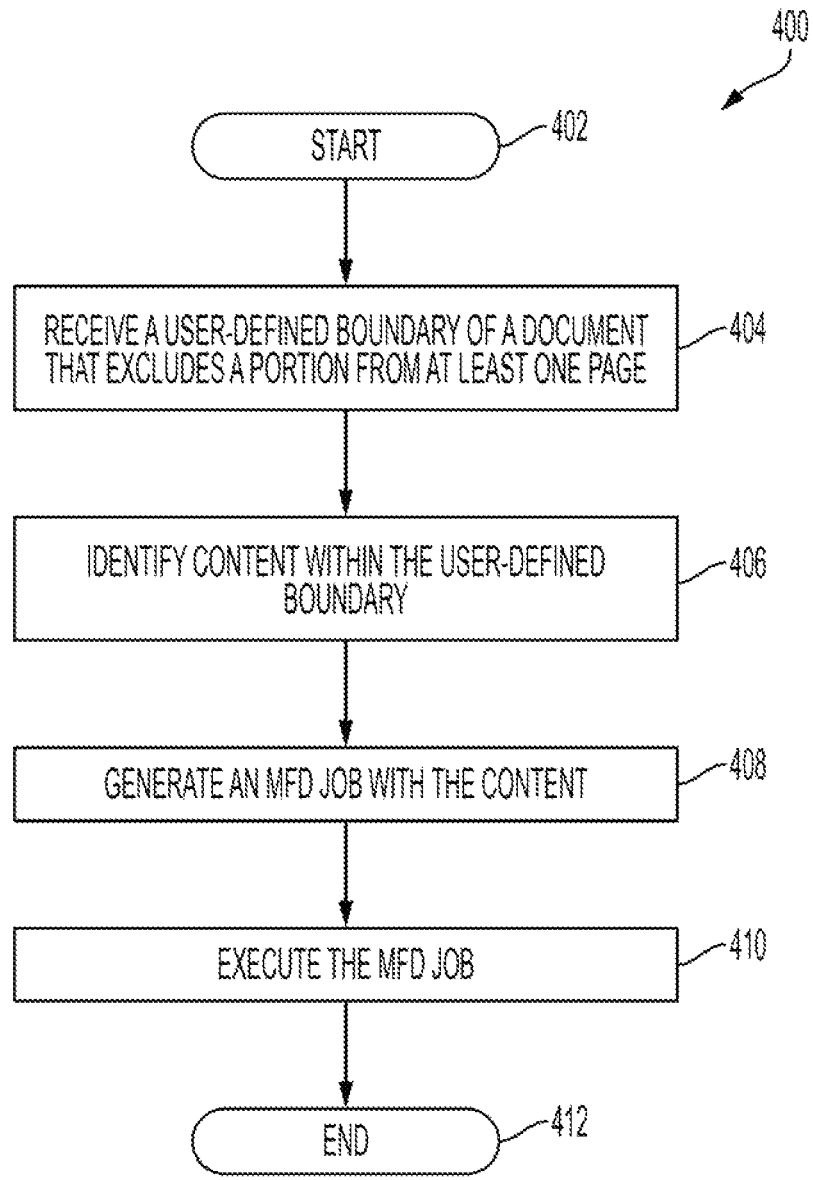
FIG. 4 illustrates a flow chart for a method of processing a job request for a document with user-defined boundaries of the present disclosure.

FIG. 4 illustrates a flow chart of an example method 400 for processing a job request for a document with user-defined boundaries of the present disclosure. In one embodiment, the method 400 may be performed by the MFD 100 described above or by an apparatus such as the apparatus 500 illustrated in FIG. 5 and discussed below.

In one embodiment, the method 400 begins at block 402. At block 404, the method 400 receives a user-defined boundary of a document that excludes a portion from at least one page. For example, the user-defined boundary may be received remotely from a user interface of an endpoint device that is communicatively connected to an MFD or locally from the user interface of the MFD itself.

In one embodiment, the user-defined boundary may be defined using a touch screen display or a non-touch screen display. The user interface may allow a user to draw an outline around the desired content that excludes some content from a page to define the user-defined boundary. In another example, the user interface may provide a drop down menu that may allow a user to define the user-defined boundary using a selection of a chapter, a selection from a table of contents, a particular format, or providing a beginning word and an ending word.

At block 406, the method 400 identifies content within the user-defined boundary. For example, the user-defined boundary may include a first portion of content on a first page of the document and a second portion of content on a second page of the document.

At block 408, the method 400 generates an MFD job with the content. For example, the first portion of content and the second portion of content may be combined onto a single page for the print job. The combined content may then be moved to a first printable line of a page of the job request. In other words, the content that previously spanned two pages may be combined into a single page that starts from a top of the page of the print job. Although the example illustrates the reduction of two pages into one page, it should be noted that the number of pages may be reduced to any number of pages (e.g., 50 pages to less than 50 pages, 10 pages to less than 10 pages, and the like).

In one embodiment, the MFD job may be a print job, a scan job, or a copy job. The user-defined boundary may be associated with the document and saved to memory, a new document may be created and saved that includes content within the user-defined boundary, or the user-defined boundary may be saved as a separate output file. For example, the user-defined boundary and document may be saved to the memory of the MFD or to a storage server/print server in the cloud. As a result, the user may print the document and only the content in the user-defined boundary may be printed or the output file with the user-defined boundary for the document may be retrieved at a subsequent time for printing or electronic transmission.

At block 410, the method 400 executes the MFD job. For example, the MFD may print, scan, or copy the document that includes the selected content combined onto a single page or a number of pages that is less than the number of pages used by the selected content in the original document. At block 412, the method 400 ends.

Figure 5:
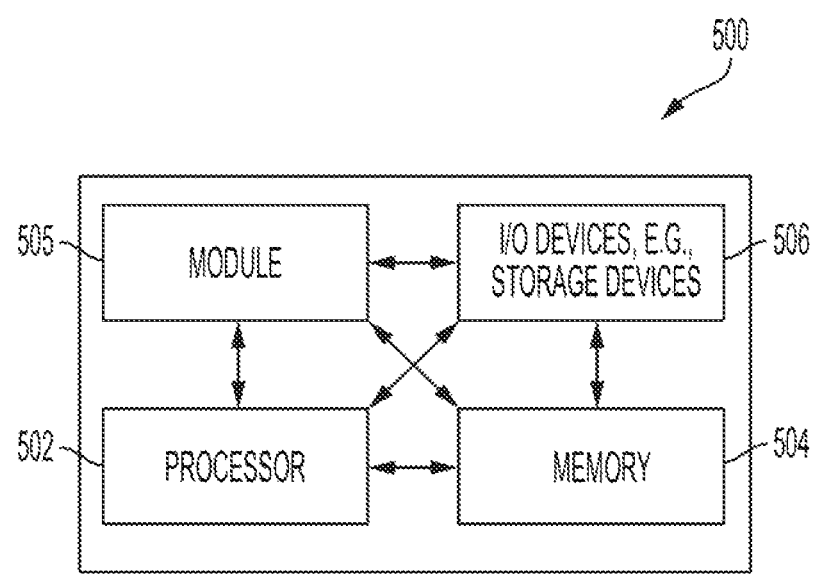
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for processing a job request for a document with user-defined boundaries, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for processing a job request for a document with user-defined boundaries (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for processing a job request for a document with user-defined boundaries (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   receiving, by a processor of a multi-function device (MFD), a user-defined boundary in a document that excludes a portion from at least one page of the document, wherein the user-defined boundary includes a first portion of content on a first page of the document and a second portion of content on a second page of the document;
   identifying, by the processor, content within the user-defined boundary;
   generating, by the processor, an MFD job with the content, but excluding the portion from the at least one page; and
   executing, by the processor, the MFD job.

2. The method of claim 1, wherein the first portion of content and the second portion of content are combined onto a single page for the MFD job.

3. The method of claim 2, wherein white space contained between the first portion of the content and the second portion of the content within the user-defined boundary is removed for the MFD job that is generated.

4. The method of claim 1, wherein the user-defined boundary is received via an endpoint device communicatively coupled to the MFD, wherein a print driver of the endpoint device provides a print menu that allows a user to provide the user-defined boundary.

5. The method of claim 1, wherein the user-defined boundary is received via a user interface of the MFD.

6. The method of claim 1, wherein the user-defined boundary is defined via an outline selection made by outlining the content.

7. The method of claim 1, wherein the user-defined boundary is defined via a selection made in a drop down menu.

8. The method of claim 7, wherein the drop down menu includes at least one of: a chapter selection, a format selection, a table of contents selection, a beginning word and an ending word selection, a pictures only selection, or a text only selection.

9. The method of claim 1, wherein the generating comprises:
moving, by the processor, the content to start on a first line of a page of the MFD job.

10. The method of claim 1, wherein the MFD job comprises a print job, a scan job, or a copy job.

11. The method of claim 1, further comprising:
saving, by the processor, the user-defined boundary to be associated with the document; or
saving, by the processor, the user-defined boundary as a separate output file.

12. A multi-function device (MFD), comprising:
a processor; and
a non-transitory computer readable medium storing instructions, which when executed by the processor, cause the processor to:
receive a user-defined boundary in a document that excludes a portion from at least one page, wherein the user-defined boundary includes a first portion of content on a first page of the document and a second portion of content on a second page of the document;
identify content within the user-defined boundary;
generate an MFD job with the content but excluding the portion from the at least one page; and
execute the MFD job.

13. The MFD of claim 12, wherein the first portion of content and the second portion of content are combined onto a single page for the MFD job.

14. The MFD of claim 12, wherein the user-defined boundary is received via an endpoint device communicatively coupled to the MFD, wherein a print driver of the endpoint device provides a print menu that allows a user to provide the user-defined boundary.

15. The MFD of claim 12, further comprising:
a user interface, wherein the user-defined boundary is received via the user interface.

16. The MFD of claim 12, wherein the user-defined boundary is defined via an outline selection made by outlining the content.

17. A method, comprising:
receiving, by a processor of a multi-function device (MFD), a user-defined boundary in a document, wherein the user-defined boundary begins or ends after a first line or before a last line of a page of the document, wherein the user-defined boundary includes a first portion of content on a first page of the document and a second portion of content on a second page of the document;
identifying, by the processor, content within the user-defined boundary;
generating, by the processor, a print job with the content, wherein the print job moves the content to start as a first line of a first page of the print job and the first portion of content and the second portion of content are combined onto a single page for the print job; and
executing, by the processor, the print job.

* * * * *